(12) United States Patent
Azogui et al.

(10) Patent No.: US 12,271,954 B2
(45) Date of Patent: Apr. 8, 2025

(54) SYSTEMS, METHODS, AND APPARATUSES FOR PAYROLL MODULE ANALYSIS

(71) Applicant: OLME.US LLC, New York, NY (US)

(72) Inventors: Ariella Azogui, New York, NY (US); Marcus Hoed, New York, NY (US)

(73) Assignee: OLME.US LLC, New York, NY (US)

( * ) Notice: Subject to any disclaimer, the term of this patent is extended or adjusted under 35 U.S.C. 154(b) by 231 days.

(21) Appl. No.: 17/736,990

(22) Filed: May 4, 2022

(65) Prior Publication Data

US 2022/0375002 A1    Nov. 24, 2022

Related U.S. Application Data

(60) Provisional application No. 63/184,180, filed on May 4, 2021.

(51) Int. Cl.
    *G06Q 40/12*    (2023.01)
(52) U.S. Cl.
    CPC ................... *G06Q 40/125* (2013.12)
(58) Field of Classification Search
    CPC .................................................... G06Q 40/125
    See application file for complete search history.

(56) References Cited

U.S. PATENT DOCUMENTS

| | | | | |
|---|---|---|---|---|
| 5,919,239 A * | 7/1999 | Fraker | ...................... | G01S 19/07 |
| | | | | 701/541 |
| 6,356,875 B1 * | 3/2002 | Green | .................... | G06Q 40/02 |
| | | | | 705/7.38 |
| 7,102,493 B1 * | 9/2006 | Coppinger | ............. | G06Q 10/08 |
| | | | | 340/988 |
| 9,020,848 B1 * | 4/2015 | Ridge | ...................... | G07C 1/10 |
| | | | | 705/7.15 |
| 9,064,285 B1 * | 6/2015 | Nathoo | ................ | G06Q 40/125 |
| 9,396,232 B1 * | 7/2016 | Kapoor | ............. | G06F 16/24564 |

(Continued)

OTHER PUBLICATIONS

Zielinski, Dave. On the Clock: New Time and Attendance Software Helps Track Labor Costs and Ensure Legal Compliance. vol. 57. Society for Human Resource Management, 2012. Print. (Year: 2012).*

(Continued)

*Primary Examiner* — Ashford S Hayles
(74) *Attorney, Agent, or Firm* — Bochner PLLC; Andrew Bochner; Eric Kleinertz

(57) ABSTRACT

Provided may be a computer system for payroll management wherein the stored program instructions cause the processor to correlate each of a plurality of employees to one of a plurality of scheduled positions and a payroll type; determine a scheduled start time, a scheduled end time, a scheduled location-in location, and a scheduled location-out location based on a work schedule for each of the employees; receive, via an employee device, a first scan time and a clock-in time; determine an actual clock-in location based on a clock-in geolocation generated by the employee device upon the generation of the clock-in input; receive, via the employee device, a last scan time and a clock-out time; determine an actual clock-out location based on a clock-out geolocation generated by the employee device upon the generation of the clock-out input; and determine a location-in distance and determine a location-out distance.

10 Claims, 7 Drawing Sheets

(56) References Cited

U.S. PATENT DOCUMENTS

| | | | |
|---|---|---|---|
| 9,454,751 B1* | 9/2016 | Dickerson | G06Q 10/1091 |
| 10,083,489 B1* | 9/2018 | Nathoo | G06Q 40/125 |
| 10,713,737 B1* | 7/2020 | Blackburn | G06Q 50/08 |
| 10,740,728 B1* | 8/2020 | Gabay | G06F 21/64 |
| 10,846,812 B1* | 11/2020 | Lee | G06Q 10/06311 |
| 10,878,377 B1* | 12/2020 | Kim | G06F 16/2379 |
| 10,939,235 B1* | 3/2021 | Dym | G06Q 10/1091 |
| 11,900,285 B1* | 2/2024 | Frantz | G06Q 10/1091 |
| 2003/0043266 A1* | 3/2003 | Yoshikawa | G07C 1/10 |
| | | | 382/128 |
| 2007/0145113 A1* | 6/2007 | Keller | G06K 17/00 |
| | | | 235/462.46 |
| 2007/0208585 A1* | 9/2007 | Bernhard | G06Q 10/04 |
| | | | 705/336 |
| 2008/0065396 A1* | 3/2008 | Marshall | G06Q 10/10 |
| | | | 705/16 |
| 2008/0172311 A1* | 7/2008 | Curran | G06Q 30/04 |
| | | | 705/32 |
| 2009/0049057 A1* | 2/2009 | Ghani | G06Q 30/02 |
| | | | 709/219 |
| 2012/0136688 A1* | 5/2012 | Fouad | G06Q 10/063114 |
| | | | 705/7.15 |
| 2012/0246039 A1* | 9/2012 | Fain | G06Q 10/08355 |
| | | | 705/341 |
| 2013/0006718 A1* | 1/2013 | Nielsen | G06Q 10/06312 |
| | | | 705/7.42 |
| 2013/0024334 A1* | 1/2013 | Kozlay | G06Q 10/063114 |
| | | | 340/5.83 |
| 2013/0090965 A1* | 4/2013 | Rivere | G06Q 10/06311 |
| | | | 705/7.15 |
| 2013/0191175 A1* | 7/2013 | Miller | G06K 5/00 |
| | | | 235/380 |
| 2013/0289873 A1* | 10/2013 | Mitchell | G06Q 10/08 |
| | | | 701/482 |
| 2014/0099975 A1* | 4/2014 | Pierce, II | H04W 4/021 |
| | | | 455/456.3 |
| 2014/0114824 A1* | 4/2014 | Kong | G06Q 10/1091 |
| | | | 705/32 |
| 2014/0249877 A1* | 9/2014 | Hull | H04W 4/029 |
| | | | 705/7.15 |
| 2014/0279672 A1* | 9/2014 | Liu | G06Q 10/10 |
| | | | 705/345 |
| 2015/0248795 A1* | 9/2015 | Davidson | G01C 21/34 |
| | | | 701/1 |
| 2015/0310566 A1* | 10/2015 | Smyth | G06Q 40/125 |
| | | | 705/32 |
| 2015/0327011 A1* | 11/2015 | Fairbanks | G01S 5/013 |
| | | | 455/456.3 |
| 2015/0348214 A1* | 12/2015 | Jain | G06Q 40/125 |
| | | | 705/14.58 |
| 2015/0348215 A1* | 12/2015 | Doll | G06Q 30/018 |
| | | | 705/32 |
| 2016/0065658 A1* | 3/2016 | Alon | G06Q 10/063116 |
| | | | 709/204 |
| 2016/0217422 A1* | 7/2016 | Dujisin | G06Q 10/103 |
| 2016/0379202 A1* | 12/2016 | Turner | G06Q 20/321 |
| | | | 705/39 |
| 2017/0069036 A1* | 3/2017 | Shaaban | G06Q 10/1091 |
| 2017/0243170 A1* | 8/2017 | Rashid | H04W 4/021 |
| 2018/0130025 A1* | 5/2018 | Kampouris | G06Q 10/1091 |
| 2018/0308063 A1* | 10/2018 | Jan | G07C 9/257 |
| 2019/0034855 A1* | 1/2019 | Halioris | G06Q 10/08 |
| 2019/0057340 A1* | 2/2019 | Wang | G06Q 10/109 |
| 2019/0066058 A1* | 2/2019 | Spurgeon | G06Q 10/1091 |
| 2019/0172002 A1* | 6/2019 | Zhang | G06F 1/163 |
| 2019/0287068 A1* | 9/2019 | Bylahalli | G06Q 30/06 |
| 2019/0295144 A1* | 9/2019 | Catino | G06Q 10/06 |
| 2019/0340876 A1* | 11/2019 | Northrup | G07F 17/3241 |
| 2020/0042936 A1* | 2/2020 | Jain | G06F 40/14 |
| 2020/0293996 A1* | 9/2020 | Wu | G06Q 10/0833 |
| 2021/0097473 A1* | 4/2021 | Kakaire | G06Q 10/063114 |
| 2021/0182870 A1* | 6/2021 | Degeneffe | G06Q 10/1091 |
| 2021/0319379 A1* | 10/2021 | Martinez | G06F 16/9035 |
| 2021/0334763 A1* | 10/2021 | Betori | G06Q 20/3224 |
| 2022/0058586 A1* | 2/2022 | Dias | G06Q 10/063114 |
| 2022/0172169 A1* | 6/2022 | Carzoli | G06Q 10/1091 |
| 2022/0188943 A1* | 6/2022 | Krug | G06F 30/20 |
| 2022/0301357 A1* | 9/2022 | Carzoli | H04W 4/021 |
| 2023/0214772 A1* | 7/2023 | Dearing | G06Q 10/04 |
| | | | 235/385 |

OTHER PUBLICATIONS

Romana, J. M. (2018). Aideready: A mobile app-based home care agency (Order No. 10751625). Available from ProQuest Central; ProQuest Dissertations & Theses Global. (2041077692). Retrieved from https://www.proquest.com/dissertations-theses/aideready-mobile-app-based-home-care-agency/docview/2041077692/ (Year: 2018).*

* cited by examiner

Payroll

| Select Start Date | | Select End Date | | | | Payroll Type ▸ | | | Select Employee ▸ | |
|---|---|---|---|---|---|---|---|---|---|---|
| Hourly Employees ▾ | | | | | | Hourly Employees | | | All | |
| Approval Status ▸ | | | | | | All | | | | |
| All | | | | | | Doing Delivery / Same Location | | | | |
| Approved | | Apply | | | | Not Doing Delivery / Same Location | | | | |
| Unapproved | | | | | | Doing Delivery / Different Location | | | | |
| | | | | | | MM Driver | | | | Show |
| | | | | | | Salaried Employees | | | | |
| | | | | | | All | | | | |

| Employee | Scheduled Position | Payroll Type | Scheduled Start | 1st Scan | Clock In | Location In | Scheduled End | Last Scan | Clock Out | Location Out | Approval |
|---|---|---|---|---|---|---|---|---|---|---|---|
| James | Position 1 | Doing Delivery / Different Location | 04/15/2021 7:00am | 04/15/2021 6:58am | 04/15/2021 6:55am | Scheduled Location ✓<br>Clock In Location ✓<br>Distance : 100m | 04/15/2021 9:00pm | 04/15/2021 8:55pm | 04/15/2021 8:45pm | Scheduled Location ✓<br>Clock In Location ✓<br>Distance : 110m | Auto Approved >> |
| Kate | Position 2 | Doing Delivery / Same Location | 04/15/2021 6:00am | 04/15/2021 5:58am | 04/15/2021 5:55am | Scheduled Location ✓<br>Clock In Location ✓<br>Distance : 423m | 04/15/2021 10:00pm | 04/15/2021 9:55pm | 04/15/2021 9:45pm | Scheduled Location ✓<br>Clock In Location ✓<br>Distance : 98m | Approved >> |
| Jane | Position 2 | Not Doing Delivery / Same Location | 04/15/2021 8:00am | | 04/15/2021 7:55am | Scheduled Location ✓<br>Clock In Location ✓<br>Distance : 100m | 04/15/2021 8:00pm | | 04/15/2021 7:45pm | Scheduled Location ✓<br>Clock In Location ✓<br>Distance : 500m | Exception >> |
| Patrik | Position 4 | MM Driver | 04/15/2021 7:00am | | 04/15/2021 6:55am | Scheduled Location ✓<br>Clock In Location ✓<br>Distance : 100m | 04/15/2021 4:00pm | | 04/15/2021 3:55pm | Scheduled Location ✓<br>Clock In Location ✓<br>Distance : 200m | Auto Approved >> |

FIG. 3

Payroll

| Payroll Type ▼ |
| --- |
| Hourly employees |
| All |
| Doing Delivery / Same Location |
| Not Doing Delivery / Same Location |
| Doing Delivery / Different Location |
| MM Driver |
| Salaried employees |
| All |

FIG. 4A

Salaried Employees ⌄

| Punch Status ▼ |
| --- |
| All |
| Punched in |
| Not punched in |

[Apply]

| Employee | Date | Attendance |
| --- | --- | --- |
| Robert | 04/21/2020 | [____] |
| Kali | 04/21/2020 | |
| Sam | 04/21/2020 | |
| Francis | 04/21/2020 | [____] |

FIG. 4B

Violations Report John Smith

Date
Select Date

Add New Violation

Position
Select Position
FBM Driver

DA Name
I select DA name

Violation type
Select Violation type
Failing to return company equipment

Save

FIG. 5

SYSTEMS, METHODS, AND APPARATUSES FOR PAYROLL MODULE ANALYSIS

CLAIM OF PRIORITY

This application claims priority from U.S. Provisional Patent Application No. 63/184,180, filed on May 4, 2021, the contents of which are incorporated herein by reference.

FIELD OF THE INVENTION

This disclosure relates to systems, methods, and apparatuses for payroll analysis. Specifically, this disclosure relates to systems, methods, and apparatuses for internal management regarding payroll procedures for a labor force.

INTRODUCTION

The majority of companies in the "gig" economy hire individuals as 1099—Independent Contractors. Unfortunately, when doing so, the individual contractor is less connected to the work and/or company. Thus, the contractor does not always demonstrate a commitment in their attendance, which impacts performance. This issue also raises serious liability for companies because state and federal agencies closely review misclassification of individuals working with companies in "gig" industries.

Many "gig" industries do not work with 1099—Independent Contractors (for example, delivery associate positions). Many of these workers are hired as W2 employees. This enables many of these companies to control scheduling. Controlling scheduling also enables the company to better meet clients' staffing needs, set enforceable performance standards for delivery associates, cross train employees among various client groups/operations and, finally, insulates the company from exposure to any misclassification liability.

The labor pool for the delivery associate positions are lower level, entry level, minimum wage workers with limited or no work experience and often up to high school level education. Accordingly, many of these workers are not familiar with integrated systems that contain "user portals", interactive technology, digital document e-filing, and/or time tracking software.

Often, these kinds of workers (for example, delivery associates) work remotely, often at client sites. Since these are entry-level individuals, their ability to work independently, their ability to demonstrate ownership of their work assignments ensuring the timely delivery of goods, and/or ability to consistently follow company policy related to clock-in/clock-out protocol is limited. Moreover, training in the traditional, "old school" manner regarding these necessary behaviors is not well received among this population, as many are not comfortable with the academic-like approach to learning.

Like many entry-level positions, the individuals who are filling these roles may live "pay check to pay check". These circumstances can create difficulties for employees who are in need of money but must wait "until the next check" to access the wages they are entitled to. Often this leads to poor attendance, frustration, and poor work habits.

Thus, it would be desirable to provide a payroll management system configured to streamline payment processes and map each employment position to the corresponding pay schedule and/or rate. Further, it would be desirable to provide a payroll management system configured to manage payroll in view of violations detected by adjacent modules and/or manually imported by administrators. It would be yet further desirable to provide a payroll management system capable of evaluating entry of monetary tips and mapping such tips accordingly to the appropriate pay week.

Therefore, it would be ideal to have systems, methods, and apparatuses configured to analyze and improve the payroll module.

SUMMARY

In an embodiment, the invention of the present disclosure is a computer system for payroll management comprising one or more processors, one or more computer-readable memories, and one or more computer-readable storage devices, and program instructions stored on at least one of the one or more computer-readable storage devices for execution by at least one of the one or more processors via at least one of the one or more computer-readable memories, where the stored program instructions cause the one or more processors to: correlate, via the one or more processors, each of a plurality of employees to one of a plurality of scheduled positions; correlate, via the one or more processors, each of the plurality of scheduled positions to a payroll type; determine, via the one or more processors, a scheduled start time, a scheduled end time, a scheduled location-in location, and a scheduled location-out location based on a work schedule for each of the plurality of employees, wherein the work schedule for each of the plurality of employees is stored in the one or more computer-readable storage devices; and receive, via an employee device, a first scan time and a clock-in time, wherein the employee device is in electronic communication with at least the one or more computer-readable memories, wherein the first scan time is transmitted from the employee device to at least the one or more computer-readable memories, wherein the first scan time is generated based on electronic scanning of a first package of a plurality of packages, and wherein the clock-in time is generated based on a clock-in input via the employee device. In an embodiment, the stored program instructions further cause the one or more processors to determine, via the one or more processors, an actual clock-in location based on a clock-in geolocation generated by the employee device upon the generation of the clock-in input; receive, via the employee device, a last scan time and a clock-out time, wherein the last scan time is transmitted from the employee device to at least the one or more computer-readable memories, wherein the last scan time is generated based on electronic scanning of a last package of the plurality of packages, and wherein the clock-out time is generated based on a clock-out input via the employee device; determine, via the one or more processors, an actual clock-out location based on a clock-out geolocation generated by the employee device upon the generation of the clock-out input; determine, via the one or more processors, a location-in distance based on the actual clock-in location and the scheduled location-in location; and determine, via the one or more processors, a location-out distance based on the actual clock-out location and the scheduled location-out location.

In a further aspect, the stored program instructions may further cause the one or more processors to compare, via the one or more processors, the location-in distance to a location-in distance threshold; and compare, via the one or more processors, the location-out distance to a location-out distance threshold. In yet a further aspect, the stored program instructions may further cause the one or more processors to assign, via the one or more processors, one of a plurality of payroll statuses to each of the plurality of employees.

In an embodiment, the plurality of payroll statuses comprises an automatically approved status, an approved status, a declined status, and an exception status. In another aspect, the stored program instructions may further cause the one or more processors to generate, via the one or more processors, and display, via one or more displays, a payroll management module interface comprising a table populated by at least the scheduled start time, the first scan time, the clock-in time, the scheduled end time, the last scan time, the clock-out time, and the status of each of the plurality of employees.

The payroll management module interface may comprise an edit functionality configured to enable an administrator to modify at least the status of each of the plurality of employees. The payroll management module interface may comprise a sort functionality configured to enable an administrator to sort by the payroll type.

In an embodiment, the stored program instructions may further cause the one or more processors to generate, if the clock-in input is not generated and the scheduled start time is later than the first scan time, an approved clock-in time, wherein the approved clock-in time is a preparation time less than the first scan time.

In a further embodiment, the stored program instructions further cause the one or more processors to import, via the one or more processors, a tip spreadsheet to the one or more computer-readable storage devices, wherein the tip spreadsheet comprises a plurality of tips, wherein each of the plurality of the tips corresponds to a pay week and one of the plurality of employees; determine, via the one or more processors, whether one or more of the plurality of tips was transmitted after a tip deadline and before a pay week end time; and aggregate, via the one or more processors, the one or more of the plurality of tips that were transmitted after the tip deadline and before the pay week end time to a tip disbursement for each of the plurality of employees. The stored program instructions may further cause the one or more processors to generate, via the one or more processors, and display, via one or more displays, a tips interface, wherein the tips interface comprises a tip visualization based on the plurality of tips for one of the plurality of employees.

Additional aspects related to this disclosure are set forth, in part, in the description which follows, and, in part, will be obvious from the description, or may be learned by practice of this disclosure.

It is to be understood that both the forgoing and the following descriptions are exemplary and explanatory only and are not intended to limit the claimed disclosure or application thereof in any manner whatsoever.

These and other aspects, features, and advantages of the present invention will become more readily apparent from the following drawings and the detailed description of the preferred embodiments.

BRIEF DESCRIPTION OF THE DRAWINGS

The incorporated drawings, which are incorporated in and constitute a part of this specification exemplify the aspects of the present disclosure and, together with the description, explain and illustrate principles of this disclosure.

FIG. 3 illustrates an embodiment of a payroll module interface.

FIG. 4A illustrates an embodiment of a payroll type selection interface.

FIG. 4B illustrates an embodiment of a salaried employee interface.

FIG. 5 illustrates an embodiment of a violations report interface.

DETAILED DESCRIPTION

Figure 1:
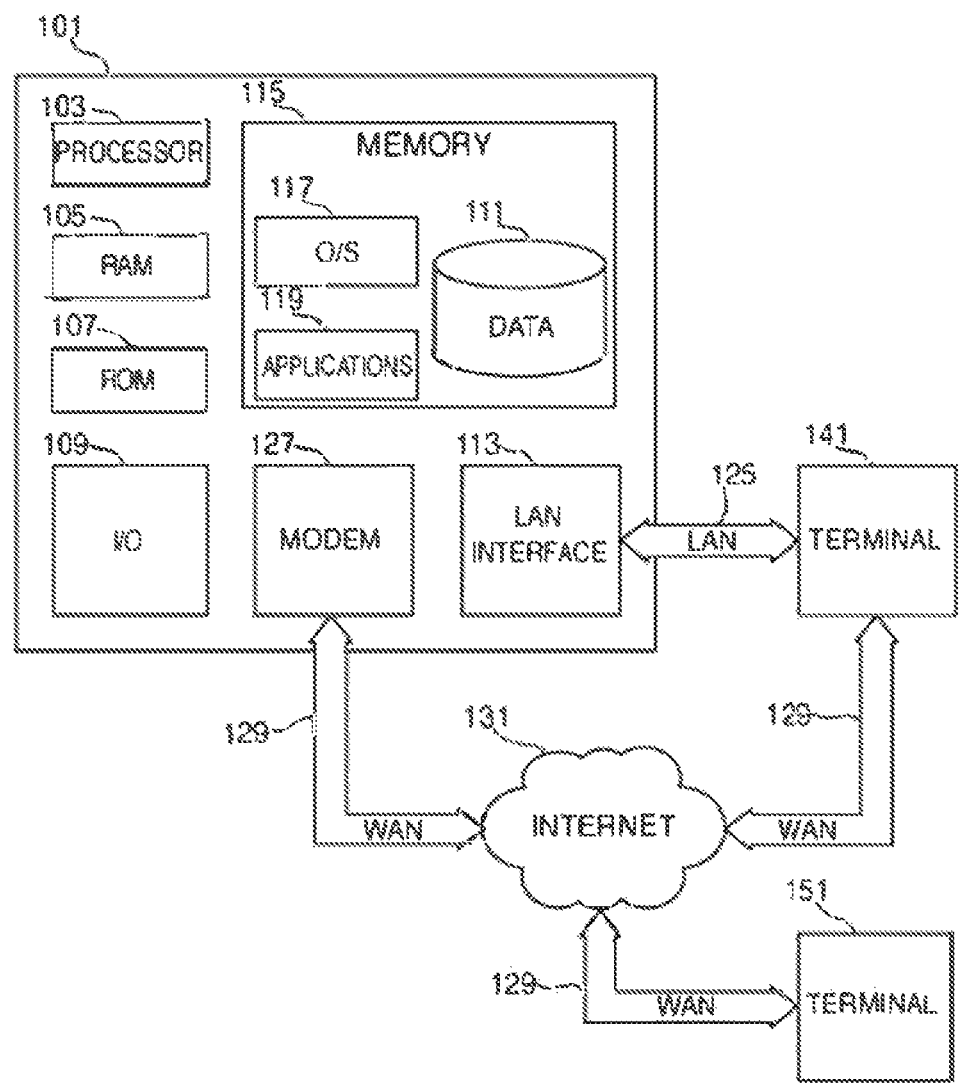
FIG. 1 illustrates a block diagram of a distributed computer system that can implement one or more aspects of an embodiment of the present invention.

The detailed description provided herein, along with accompanying figures, illustrates one or more embodiments, but is not intended to describe all possible embodiments. The detailed description provides exemplary systems and methods of technologies, but is not meant to be limiting, and similar or equivalent technologies, systems, and/or methods may be realized according to other examples as well.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or process the software in a distributive manner by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" as used herein typically includes and refers to executable instructions, code, data, applications, programs, program modules, or the like maintained in an electronic device such as a ROM. The term "software" as used herein typically includes and refers to computer-executable instructions, code, data, applications, programs, program modules, firmware, and the like maintained in or on any form or type of computer-readable media that is configured for storing computer-executable instructions or the like in a manner that may be accessible to a computing device.

The terms "computer-readable medium", "computer-readable media", and the like as used herein and in the claims are limited to referring strictly to one or more statutory apparatus, article of manufacture, or the like that is not a signal or carrier wave per se. Thus, computer-readable media, as the term is used herein, is intended to be and must be interpreted as statutory subject matter.

The term "computing device" as used herein and in the claims is limited to referring strictly to one or more statutory apparatus, article of manufacture, or the like that is not a signal or carrier wave per se, such as computing device 101 that encompasses client devices, mobile devices, wearable devices, one or more servers, network services such as an Internet services or corporate network services based on one or more computers, and the like, and/or any combination thereof. Thus, a computing device, as the term is used herein, is also intended to be and must be interpreted as statutory subject matter.

FIG. 1 is an illustrative block diagram of system 100 based on a computer 101. The computer 101 may have a processor 103 for controlling the operation of the device and its associated components, and may include RAM 105, ROM 107, input/output module 109, and a memory 115. The processor 103 will also execute all software running on the computer—e.g., the operating system. Other components commonly used for computers such as EEPROM or Flash memory or any other suitable components may also be part of the computer 101.

The memory 115 may be comprised of any suitable permanent storage technology—e.g., a hard drive. The memory 115 stores software including the operating system 117 any application(s) 119 along with any data 111 needed for the operation of the system 100. Alternatively, some or all of computer executable instructions may be embodied in hardware or firmware (not shown). The computer 101 executes the instructions embodied by the software to perform various functions.

Input/output ("I/O") module may include connectivity to a microphone, keyboard, touch screen, and/or stylus through which a user of computer 101 may provide input, and may also include one or more speakers for providing audio output and a video display device for providing textual, audiovisual and/or graphical output.

System 100 may be connected to other systems via a LAN interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages. As a non-limiting example, the server architecture may be divided into three parts, a front end, a back end, and a database. The front end may be opened as a URL in the user's web browser and loaded therein (for example, utilizing the browser's memory). Accordingly, the server frontend may present the various interfaces described herein to the user. The back end may be called upon by requests originating from the front end (for example, recalling the list of the users or adding a user). Each of these requests may perform a read or write operation on the database. Thus, in the database data may be stored and manipulated by the back end (for example, either read or write, wherein writing may include creation of new rows or updates to preexisting data).

Additionally, application program(s) 119, which may be used by computer 101, may include computer executable instructions for invoking user functionality related to communication, such as email, Short Message Service (SMS), and voice input and speech recognition applications.

Computer 101 and/or terminals 141 or 151 may also be devices including various other components, such as a battery, speaker, and antennas (not shown).

Terminal 151 and/or terminal 141 may be portable devices such as a laptop, cell phone, smartphone, smartwatch, or any other suitable device for storing, transmitting and/or transporting relevant information. Terminals 151 and/or terminal 141 may be other devices. These devices may be identical to system 100 or different. The differences may be related to hardware components and/or software components.

Figure 2:
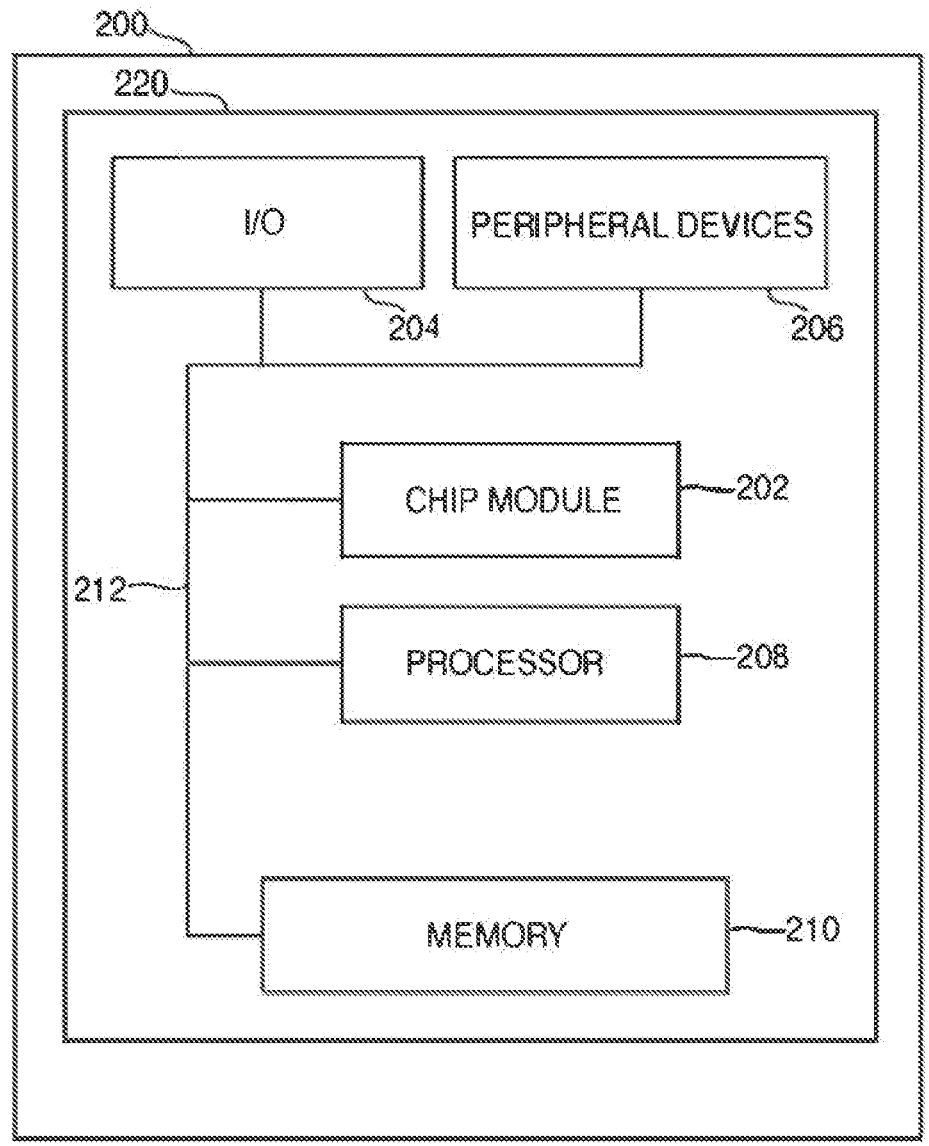
FIG. 2 illustrates a block diagram of an electronic device that can implement one or more aspects of an embodiment of the invention.

FIG. 2 shows illustrative apparatus 200. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may test submitted information for validity, scrape relevant information, aggregate user financial data and/or provide an auth-determination score(s) and machine-readable memory 210.

Machine-readable memory 210 may be configured to store in machine-readable data structures: information pertaining to a user, information pertaining to an account holder and the accounts which he may hold, the current time, information pertaining to historical user account activity and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Disclosed herein are systems, apparatuses, and methods (the "System") for payroll analysis.

In an embodiment, the invention of the present disclosure is a system for payroll analysis, utilizing a mapping scheme to connect employees to the correct payroll type. For example, a business may employee individuals of various roles and/or positions, wherein each of the various roles and/or positions have corresponding pay rates or other payroll requirements or characteristics. Accordingly, the system described herein may, in part, map employment type to the corresponding payroll type.

For the purposes of this disclosure, the terms "DA," "Delivery Associate," and "employee" may be interchangeable. For the purposes of this disclosure, the "HUMANITY" software may be interchangeable with any other suitable time clock software or other suitable employee time-tracking methods.

The present disclosure may include a user management module. The user management module may include at least one digital button. The button may be activated by input via a touch screen, or via a user "clicking" the button via a mouse. In an embodiment, there is an "add user" or "create" button. Activation of such buttons may generate and display one or more add user input fields to the user. The add user input fields may allow a user to enter, via an input method, a first name, last name, email, password, role, or status of a user, for the purpose of creating a user account. Other information may include date of birth, phone number, address, or any other suitable information. The aggregation of the created user accounts may be stored in a database and may be retrieved to aid other processes described herein.

The GUI may include a "read" button. Activating the read button may display a table containing information relating to registered users. Such information may include any information entered into the add user input fields for each registered user. Additional information may include access status and user creation date. The table may also include a plurality of options displayed as buttons. These options may include "unlock/lock," "delete," "edit," or any other suitable option. Information pertaining to users may be stored in an employee database in the server back end. Such a database may be displayed to the user in the front end after a request call to the back end, which induces data retrieval from the database. For example, such information may be retrieved when the user loads the corresponding page, causing a request to be sent to the back end to retrieve the users list data.

In an embodiment, the user interface includes an "update" button. Activating the update button may allow a user to edit the information originally entered into the add user input fields for a specific user.

The user interface may include a "delete" button. Activating the delete button may cause a pop-up window to appear on the display. The pop-up window may contain a confirmation message asking the user to confirm whether they wish to delete a specific user account. A user may then interact with a confirm button displayed in the pop-up window to delete a specific user account. Alternatively, the user may interact with a cancel button displayed in the pop-up window to cancel the "delete" action.

The user management module may allow for an administrator or other suitable user to unlock a user. For example, if a user is locked, another party may unlock said user via the user management module. In an embodiment, a user may be locked automatically if said user fails to provide valid login credentials. For the purpose of this disclosure, a "locked" user may be a user who cannot access modules that would otherwise be available after the user interface module. The user management module may record the content and number of invalid login attempts. Further, the system may lock the user after a pre-determined number of failed attempts. As a non-limiting example, the user may be locked after three failed attempts. However, the user may be locked after any suitable number of failed attempts. In one embodiment, the user is completely locked out from the system (for example, unable to access any component of the system). However, in another embodiment, the user may be enabled to access the user management module, but may not progress further than said module. The process of locking a user may be for security measures (for example, to prevent unauthorized or fraudulent access). In an embodiment, one or more individuals or classes of individuals may be authorized to lock and/or unlock a user. For example, in one embodiment, a super administrator is authorized to and capable of unlocking a user through the user management interface. A pop-up window or other suitable alert may be delivered to notify the user of the invalid login. Further, a pop-up window or other suitable alert may be delivered to the super administrator. Such an administrator notification may require a confirmation of the action. For example, the super administrator may receive an automatic email or other electronic correspondence informing him or her that a user is locked. The notification may direct the administrator to the user management module or may allow the administrator to confirm or reject a decision at the point of the notification (for example, via one or more links provided in the notification).

The user interface module may present an administrator with the option to enable or disable a user. An enabled user may be an active user who can access the system at all times. A disabled user is a user whose account has been deactivated and, thus, cannot access the system. An administrator, for example a super administrator, may enable or disable users via the user management module. In an embodiment, the roles of administrator and super administrator may differ by the fact that only super administrator can manage the user of the system and the administrator cannot. However such a configuration may be a default setting that can be modified by any existing permission in the system. As a non-limiting example, permissions in the system can include manipulating the payroll or importing tips. In effect, permissions may correspond to each action in the system, wherein, further a permission may be mapped to a user role (for example, super administrator, administrator, employee user, etc.).

In an embodiment, the user management module may include a means of filtering. For example, the user interface may display a list of all users. The list or table may include each user and/or corresponding information. Accordingly, the administrator may filter the list or table by any desired attribute. For example, the administrator may filter the list or table by first name, last name, email, creation date, role, status (for example, enabled or disabled), access (for example, locked or unlocked), or any other suitable attribute.

The user management module may include a pagination selection. The pagination selection may be configured to increase or decrease the number of users displayed on the table per page. For example, by default the table may display ten users. However, this view may be modified to display any desired number of users per page. In an embodiment, the pagination selection button may be a dropdown menu where the administrator can select from predetermined numbers of users per page. For example, the dropdown menu may include predetermined increments, such as, 5, 10, 15, 20, 50, and 100 users per page.

Upon accessing the user management module, a user may check their user profile. For example, a user may select their user profile from a navigation bar disposed within the user interface. The user may check their profile to verify and/or update any of the correlating information, such as, their first name, last name, password, and/or email address.

An aspect of the present disclosure may include a role management system. The role management system may include at least one role. A role may include a set of privileges granted to a user. The role management system may include a plurality of functions that are discussed in further detail below.

The role management system may include a "create" function. The create function may allow a user to define and create a new role. In an embodiment, the user defines parameters including role name, role description, and role permissions.

The role management system may include a "read" function. The read function may allow a user to retrieve and display a table. The table may contain a list of existing roles and related information. Such related information may include role name, role description, role creation date, and various actions which may be performed in connection with the role.

In an embodiment, the role management system includes an "update" function. The update function may allow a user to edit existing roles. The update function may allow a user to edit a plurality of role parameters including role name, role description, or role permissions.

As a non-limiting example, when a user is created a role is assigned to said user corresponding to one or more permissions. In such a non-limiting example, when a user logs in to the system said user is only able to observe interfaces or components thereof that are unlocked for the user's assigned role. The system may detect the user's role and hide, alter, or show modules and components thereof according to the role. For example, the Recruiting Role may not access to the payroll module; the HR Role may have access to both recruiting module & payroll module; and/or the Payroll role may have access to the payroll module, but not the recruiting module.

The role management system may include a "delete" function. The delete function may be activated via a "delete" button displayed on a user interface of the role management system. Activating the delete button may a pop-up window to appear on the display. The pop-up window may contain a confirmation message asking the user to confirm whether they wish to delete a specific role. A user may then interact with a confirm button displayed in the pop-up window to delete a specific role. Alternatively, the use may interact with a cancel button displayed in the pop-up window to cancel the "delete" action.

In an embodiment, the role management system includes a "pagination" function. The pagination function may allow a user to customize the number of roles displayed in the read function. In an embodiment, a drop-down menu may be displayed on the user interface of the role management system when the read function is active. The drop-down menu may contain a plurality of numbers corresponding to the number of roles the user wishes to be displayed. For example, the drop-down menu may include the numbers 10, 25, 50, 75, or 100. The user may select a number within the drop-down menu to cause the user interface to display the corresponding number of roles. As a non-limiting example, the user may select "50" to cause the user interface to display 50 roles.

In an embodiment, not all users can perform the aforementioned actions, as such permissions may be limited depending on the role of the user. This will be further explained in the role management module.

The invention of the present disclosure may include a payroll module. FIG. 3 illustrates an embodiment of a payroll module interface. In such a payroll module, a user or an administrator may first select their desired fields from the payroll module interface to filter the payroll information. Accordingly, the payroll module interface may include one or more fields. In various embodiments, the fields may be equipped to accept text input, selections via dropdown, or other suitable input means. The one or more fields may be required or may not be required (for example, optional). As a non-limiting example, in order to advance, the user must fill all required fields. In an embodiment, the required fields include, but are not limited to, the date and payroll management (for example, a position and/or mapped payroll type). The non-required fields may include, but are not limited to, approval status (for example, whether or not the employee has been approved for payment), employee (for example, the employee name or associated employee ID number), and violation (for example, the number or type of violations and/or the payment to be deducted as a function of said violations).

Further, the payroll management module may include columns for employees, scheduled position, payroll type, scheduled start, first scan, clock in, location in, scheduled end, last scan, clock out, location out, and approval (for example, approval status). The scheduled start may retrieve information from the employee's work schedule in the database, to determine what time the employee is scheduled to begin work for a given day. The first scan may refer to the time when the employee first scans a package to be delivered. For example, the employee may be assigned a set number and group of packages to be delivered for a given day. The employee may be equipped with a scanner or a smart device capable of scanning the barcode or other digital data storage means associated with each package. Thus, the system may receive the scan from the employee and evaluate whether the associated package is one of the set group of packages for a given day. Further, the system may mark the package scan as the first scan and transmit such information to the payroll module. The clock in time may refer to the time when the employee "clocks in" to work. For example, the clock in time may be a function of the employee's interaction with a third-party employment software or direct communication with the system. The payroll system may evaluate whether the first scan and/or the clock in time are compliant in view of the scheduled start time. Further, the location in may refer to the location where the employee clocks in, performs the first scan, and/or is scheduled to start. In an embodiment, the system is configured to differentiate the scheduled location from the clock in location and determine the distance between said locations. The system may utilize GPS hardware within the employee's smart device and/or scanner. Thus, the GPS coordinates and/or other suitable geolocation information may be transmitted to the system to be evaluated by the payroll management module or other aspects of the system. The system may include various distance thresholds in relation to the scheduled location and the clock in location. For example, if an employee's scheduled location and clock in location differ by more than a first distance threshold, such as one hundred meters, a shift coordinator or other administrator may be notified by the system. The payroll management module may also include a scheduled end time, for example referring to the scheduled end time of an employee's shift for a given day. In a further embodiment, the payroll management module includes a last scan column. The last scan may refer to the last scan made by the employee with their smart device and/or scanner on a given day. In one embodiment, the last scan may refer to the scan made by the delivery associate prior to ultimately placing the package in the hand's of the receiving party. In another embodiment, the last scan may refer to the scan made by the delivery associate after transferring the package to the receiving party. The clock out time may refer to the time when the employee communicates to the system and/or a third-party employment software that they have completed their shift. Moreover, the system may differentiate the location out scheduled location and the location out clock out location. Similar to the delineation between the location in clock in location and location in scheduled location, the system may determine the distance between the location out scheduled location and the location out clock out location and may calculate a location out distance. The clock out location and the scheduled out location may be evaluated via the GPS and/or other suitable geolocation data retrieved from the employee's smart device and/or scanner. The system may include one or more location out distance thresholds, wherein the system may send alerts and/or take note when an employee's location distance surpasses a location out distance threshold. The payroll management module may include an approval column. The approval column may be populated by various statuses in view of the aforementioned payroll metrics. For example, the employee may be auto-approved, approved, declined, or may include an exception. Such approval statuses are described herein.

Each employee may be equipped with an employee device, for example, a tablet, a smart phone, a scanning device, and/or other computerized device. Accordingly, the employee device may be linked with the employee in the database, such that actions performed with the employee device are correlated to the employee. The employee device may be equipped with a means of scanning, for example, a camera or other scanner adapted to read barcodes and other similar data presentations. The employee device may be equipped with GPS capabilities, such that the employee device may record and transmit the geolocation of the employee device. Further, the employee device may be in electronic communication with System such that the employee may "clock in" and "clock out" with the employee device.

The payroll module interface may include a "show button." Actuation of the show button may cause a table to appear. In an embodiment, said table may include a first row comprising the number of each of the payroll statuses. The payroll statuses may include, but are not limited to, total, declined, approved, exceptions, auto-approved, and manually approved. The aforementioned table or a second table may include a row comprising the payroll information with a number of columns. The columns may include, but are not limited to, information, start, end, approval, and action. For example, clicking the action icon may display additional information beneath the selected row. As further non-limiting examples, other actions may appear on the aforementioned table(s) such as filter, sort, and/or spreadsheet export.

In an embodiment, the filter function may further filter the data by a number of metrics, for example, shift start date, shift end date, and position. The sort function may perform a sort on all the attributes shown in the one or more tables. The filter and/or sort function may display said filtered and/or sorted results within the aforementioned table(s). The spreadsheet export function may create and save a spreadsheet from the data displayed in the table(s), for example, saved in a format readable by commonly available spreadsheet software.

The invention of the present disclosure may include a payroll position and payroll type mapping module. In an embodiment, this module maps each position to its payroll type. Accordingly, this module may retrieve and/or display a list of all the available positions. In a payroll position mapping module interface, adjacent to each position, there may be a dropdown menu comprising all the payroll types, for example, as shown in FIG. 4A. If a position is already mapped, meaning it has an associated payroll type, the dropdown menu may be disabled and would thus prevent further mapping changes. In one embodiment, the payroll position and type mapping module may further comprise a search function, allowing a user or administrator to search for a certain position in the list. In a further embodiment, the system may include a salaried employee interface, for example as shown in FIG. 4B. This interface may allow for a salaried employee to punch in or out by entering an electronic identification. In an embodiment, the system includes a salaried employee menu in the Dashboard. This menu may allow for tracking the employees (for example, when they punch in or out).

The invention of the present disclosure may include a zone manager module. This module may be responsible for performing actions with zones and associating sites to zones. The zone manager module may include a list of zones. Accordingly, after selecting a program and actuating the show button, the zone manager module interface may display a list of all the zones and their corresponding sites for that program. Further, such an interface may include an option for adding a new zone. For the purposes of this disclosure, zone may refer to a pre-determined geographical area. Further, a site may refer to a particular location, wherein each site resides within a zone.

The zone manager module may include a create action. The create action may allow a user or administrator to create a zone. In one embodiment, this feature is only available if a program (for example, a delivery employment program corresponding to the duties of one or more employees) is selected. In order to create a zone, values for the zone and the site name may be entered by a user or administrator. In such an embodiment, the aforementioned entry will create a zone with the entered information for the corresponding selected program. In a preferred embodiment, the name of the zone and the site should be unique. In the event that the zone and/or the site names are not unique, the zone manager module may generate and display an error.

The zone manager module may include an update option, enabling the user or administrator to edit a zone. In such an embodiment, in the zones list, there may be a button selection enabling edits to the zone, for example, allowing updates to the name of the zone and/or the site. The updated name of the zone and/or the site should be unique. If the names of the zone and/or the sites are not unique, the zone manager module may generate and display an error. The zone manager module may also include a delete function. In such an embodiment, a user or administrator may delete a zone. For example, in the zones list, there may be a delete button allowing deletion of a zone from the zone-site mapping. In a further embodiment, deletion of a zone may trigger a pop-up or another alert requiring the user to confirm the action.

Referring to the violation management process, this module may be responsible for violation of non-payroll aspects. In such a module, there may be one or more parties involved, for example, a shift coordinator and an HR Manager. Each of the one or more parties may have pre-determined privileges within the module. Accordingly, each category of the one or more parties may interact with the module in a different manner.

Under the shift coordinator's section of the violation management module, the shift coordinator may create a report for a new violation. In reporting a new violation, the shift coordinator may select the date of the violation and enter details related to it (for example, geolocation, employee ID or employee name, the violation type, and/or a violation description, if necessary). Moreover, a list of reported violations may be generated and maintained. Such a list may be readable by the shift coordinator. After selecting a period of dates (for example, the last two weeks, the last month, year to date, or another selected period), a position, an employee name, and/or a shift coordinator, a list may be populated of all the violations for this period. Further, such a list may include additional details, for example, termination date, date of the violation, and/or total number of violations for each employee. In a further embodiment, more details may be available by selecting a desired employee (for example, the shift coordinator may select an option that presents the employee's position, program, assigned shift coordinator, and/or violation description).

Under the HR manager's section of the violation management module, the HR manager may read the list of reported violations. For example, the HR manager may be able to view the lists of violations as generated by the shift coordinator. The HR manager may be capable of interacting with the violation management aspect, for example, the portion of the violation management configured to manage the violations. The HR manager may further create and/or add a new violation type. Violation types may include failure to attend shift on time, or failure to complete work assignments while on shift. For example, the HR manager may enter values for the corresponding violation ID, violation type, and the company policy for said violation. The description of the violation may be uploaded and defined in the system to be used later in the notification sent to the employee. In an embodiment, there are two ways in which violations may be entered: (1) violations may be detected from data received from other modules (such as an image-to-text module or the payroll module), to which violations are detected automatically based on pre-defined parameters (such as delivery time minimums or maximums); and (2) violations may be manually input by administrator for violations which cannot be detected by a computer system, such as an employee attending work while intoxicated, or an employee wearing inappropriate clothing.

Accordingly, each violation type and violation ID may be unique. Further, the HR manager may be able to utilize the update functionality, enabling the HR manger to edit a violation. In such an embodiment, in the violations list, the HR manager may edit the violation, update the type of violation, and modify the corresponding company policy. The HR manger may add a new type of violation, wherein the violation is unique. Additionally, the HR manager may delete a violation. For example, in the violations list, each violation may include a deletion button, enabling removal of the violation from the violation list. In such an embodiment, removal of a violation can trigger a pop-up window or another alert requiring the HR manager to confirm the action.

The violation management module may include a means of reporting. For example, either an HR manager or a shift coordinator may report violations. In an embodiment, the violation management module may include a means of reporting with charts. After selecting a period of dates, a program, and/or a position, charts may be generated that provide details on the evolution of the violation process. For example, the charts may display the top five violations in the selected period, the top five employees with violations, and the top five positions with violations. The top five violations may refer to give most common violations, the most severe types of violations, or the most recent violation to be reported or to have occurred. In a further embodiment, the top five violations may be violations generally or in gross, and not specific to a certain employee. Thus, this may allow an administrator to view that issues are of most concern to the business. In one embodiment, the violation management module may enable reporting with tables (for example, a global view). In such an embodiment, reporting may utilize tables to have more data and more flexibility for the user: After selecting a period of dates and/or a position, one or more tables may be populated and displayed depicting the top violation type, top employee with violations, and/or top position with violations. In such an embodiment, the tables may enable more flexibility to apply filters and organize data. Moreover, the violation management module may enable reporting violations by a designated time period, for example, years, months, weeks, and/or days. Accordingly, a report may be generated to display violations from the selected time period.

Figure 6:
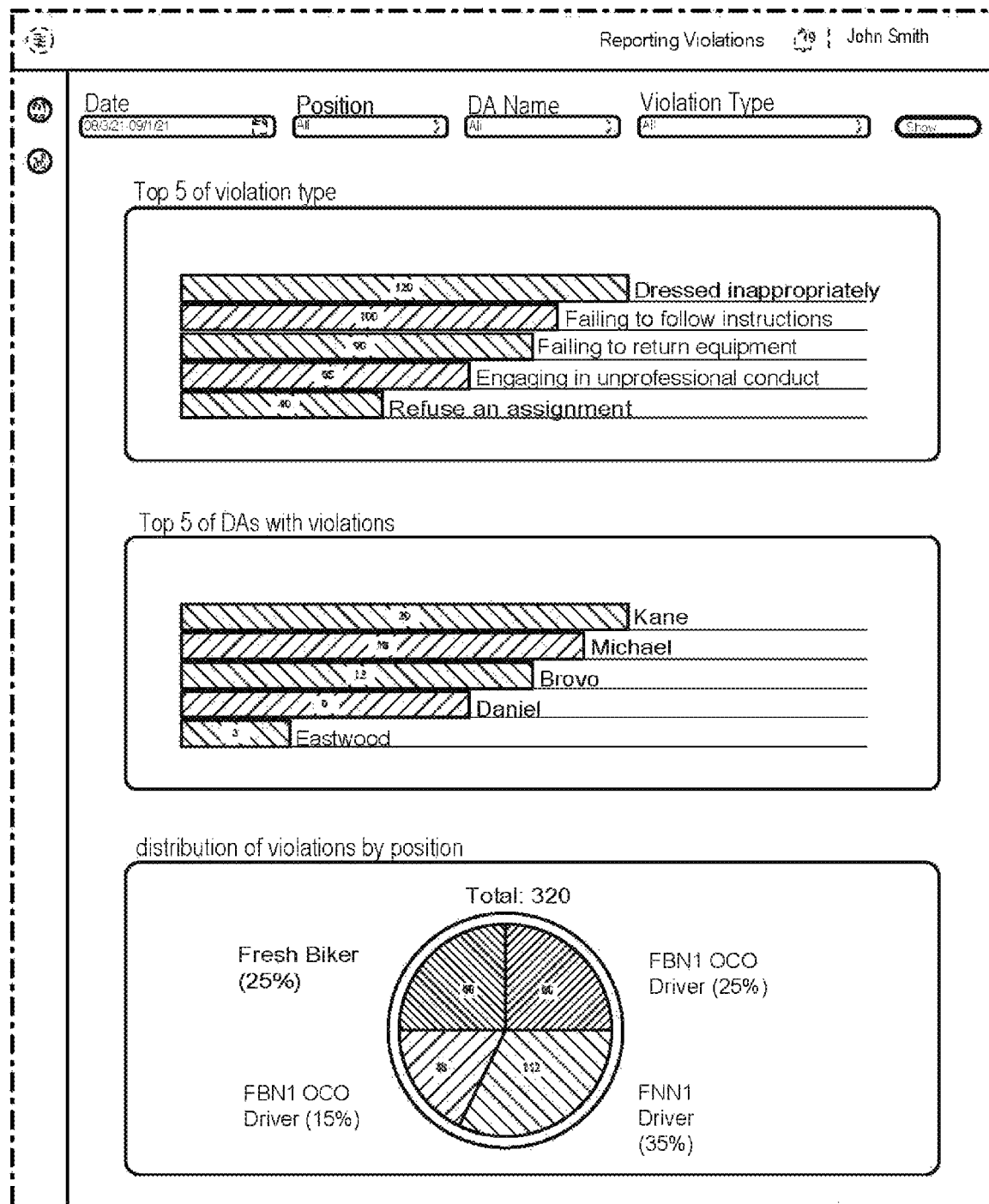
FIG. 6 illustrates an embodiment of a violations metrics interface.

As described above and illustrated in FIG. 5, the system may include a violations report interface wherein a violation may be manually entered by an administrator, for example, a shift coordinator and/or an HR manager. Further, as described above and illustrated in FIG. 6, the system may include a violations metrics interface wherein violations may be amassed, analyzed, and visually represented to the user.

The system may further include a Gross Earnings File Module. Such a module may retrieve approved clock data from HUMANITY for the last month. However, any suitable time interval may be used. Next, the module may organize the clock data by work date and/or employee ID. In an embodiment, the module then calculates the total worked hours using an algorithm. The algorithm may do the following: 1) begin with a total worked hours value of 0; 2) retrieve the current total worked hours for the current work week for a specific employee; 3) if the sum of current total worked hours for the current work week and the total hours worked that day is less than 40, then the total worked hours will be updated to include the total hours worked that day, which is the difference between the time clock start and the time clock end for that day; 4) if the current total worked hours for the current work week is less than 40, and the sum of current total worked hours for the current work week and the total hours worked that day is greater than 40, then the total worked hours will be updated to 40, which is achieved by defining the shift end time as equal to the shift start time and adding the difference between 40 and the current total worked hours for the current work week; 5) if the current total worked hours for the current work week is equal to 40, then the shift end time will equal the shift start time, resulting in 0 hours being added to the total worked hours.

The Gross Earnings File Module may generate a table via an algorithm. The table may include columns such as user_id, pay_group, shift_date, shift_earnings, shift_started_at, shift_ended_at,_shift_hours, and pay_rate, which may be defined as follows:

| | |
|---|---|
| user_id | employee humanity EID |
| pay_group | employee ADP pay group |
| shift_date | time clock work date |
| shift_earnings | equal the multiplication of shift_hours and pay_rate |
| shift_started_at | Humanity time clock start time |
| shift_ended_at | Humanity time clock end time |
| shift_hours | total hours calculated with new time clock (after calculating the total worked hours in each week and update time clock start and time clock end) |
| pay_rate | employee ADP pay rate |

The table may be converted into a CSV file, which may be sent through SFTP to daily pay servers once per hour. However, any suitable time interval may be used.

The invention of the present disclosure may further comprise a Tips Import Module. The Tips Import Module may enable importation of tips from a spreadsheet or other data store to the working database for the System. From the frontend of the application, the user of the tips import interface may select the program (for example, if the client has a corresponding program) and at least one valid file (for example, a spread sheet such as an XLSX formatted file). If the user has selected a file that is missing or includes invalid data, a request may not be sent to the server and/or an error message may be delivered to the user.

In an embodiment, tips may be received from a third-party dashboard and/or a third-party payment system. Late tips may be those tips that are paid by the customer such that they process after the end of a particular pay week. For example, if a user pays a tip via credit card or a third-party payment service after the "end of day" on a Friday, and the tip does not process until the following week. In effect, the late tips determination system of the tips module may be adapted to find tips that correlate to a previous week and update the tip database and payment flow, such that the late tips are both properly archived and disbursed to employee.

Similarly, from the system backend, the system may save the name of the files uploaded, the corresponding client, the corresponding program, the user who uploaded the files, and/or the date when the files were uploaded. The System may set the value of the added tips and the invalid tips to zero (for example, as a default). Further, the system may alter the tip importation status to pending. The system may evaluate the validity (a valid file may contain the correct data columns and an invalid file may contain missing data columns, such as tip amount, or may contain a column with an incorrect header name) of the file content. For example, if the file is invalid, the system may generate an error. Further, in such an example, the error may be displayed via the interface to the user. However, if the file is determined to be valid, the system may parse the file and convert it to a usable format (for example, a JSON formatted data set). Further, the system may retrieve an employee from the database with the corresponding email address (which is found in the file), and then save the tips data in the database. If, however, the system cannot determine the identity of the employee via the corresponding email address, the system may display an error (for example, displayed via the interface). In an embodiment, once the system parses and saves the tips, it may update the status of the parsing and the number of tips added and skipped. Additionally, the file may be removed from the server and a message may be generated with the status of the parsing that will be shown in the user interface.

Figure 7:
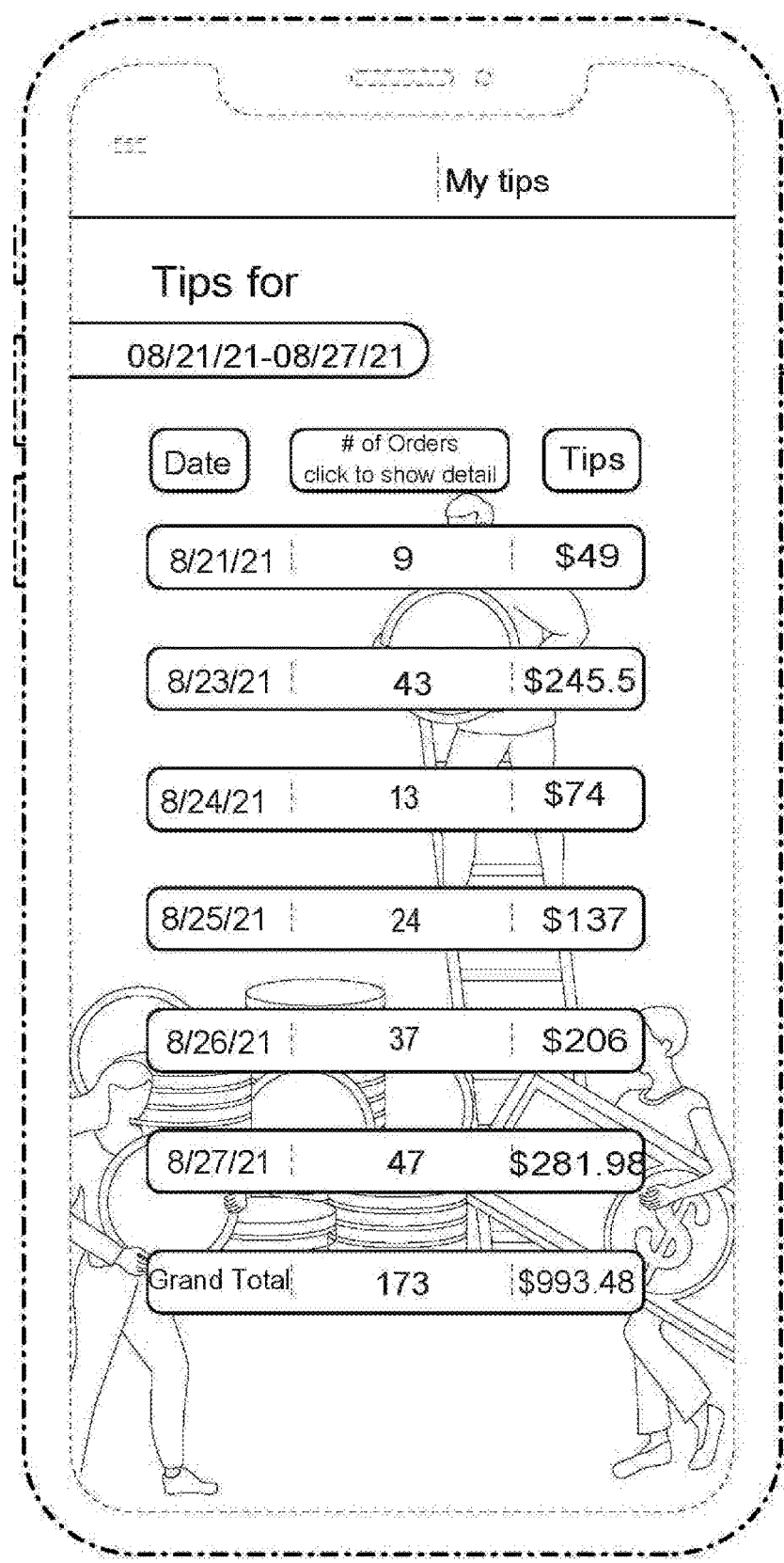
FIG. 7 illustrates an embodiment of a tip interface.

In an embodiment, as shown in FIG. 7, the system may include a tips interface for presentation to a user, such as an employee. Such a tips interface may sort received tips by date, show the number of orders for that day, and the corresponding tips for each date. The number of orders shown in such an interface may include the number of orders where a tip was collected and/or the total number of orders regardless of tip status.

The system may further comprise a Mapping Payroll Position & Type Module. The payroll management module may enable the user to map a HUMANITY position to a payroll type. Accordingly, after the mapping, the system may determine the payroll type of a specific HUMANITY position. From the frontend, the user may navigate to the mapping position payroll type interface. The interface may present the list of HUMANITY's positions. A list of payroll types may be correlated to each position on the interface. Accordingly, the interface may allow the user to select a payroll type for the position he or she wants to map. In the backend, a request may be sent to the server such that the server updates the list of positions already selected for a specific payroll type in the database. In an embodiment, once a position is mapped with a payroll type, the menu may be disabled so the mapping cannot be altered. For example, this may be implemented because a HUMANITY position is associated with a single Payroll type. Thus, if the payroll type changes, a new position may be created to maintain the coherence of the original time clock related to the originally selected position.

The system may further comprise a Tips Email Module. The Tips Email Module may enable the system to send emails, at pre-determined intervals, to DAs who have tips. For example, the Tips Email Module may be configured to send emails to such DAs every Thursday. Such emails may include the details of tips from the previous week (current pay week), as well as late tips. In the backend, at a pre-determined time, the server may collect last week tips from the database. The system may group tips by employee and work date. Thus, the system may further separate the data into late tips and in time tips. In such an embodiment, this module may facilitate the transmission of tips by email to the corresponding DAs. However, if an error occurred and an email was not sent to the server, the email data may be saved to the database and the system may retry the transmission after a second pre-determined interval (for example, one hour) as long as the number of error retrials is less than an error threshold (for example, three). Although, the emails may be controlled by the system and this module, the transmission of emails may, in part or wholly, utilize a third party API.

The system may also include a Tips Management Module. The tips module allows the user to see the tips breakdown and to "confirm" tips. Once tips are confirmed they can be included in the pay data batch sent to ADP The Tips Management Module may provide a list of tips in a date interval (for example, weekly), wherein the date interval is selected by the user. The Tips Management Module may display the details of tips for each employee in the period corresponding to the selected week. In the frontend, the user may select a year and a week. The system may then populate and display the list of tips of the selected interval. If the filter was invalid, a request may not be sent to the server. In the backend, the server may retrieve the list of tips from the database based on the date interval selected by the user. The server may group tips by employee and work date and may separate tips into tips on time and late tips. Thus, the system may then returns the corresponding data to the frontend, where the user may see a list of tips by employee and filter by program.

In an embodiment, the System may comprise a tip spreadsheet in the one or more computer-readable storage devices, wherein the tip spreadsheet comprises a plurality of tips, wherein each of the plurality of the tips corresponds to a pay week and one of the plurality of employees. Accordingly, the System may determine, via the one or more processors, whether one or more of the plurality of tips was transmitted after a tip deadline and before a pay week end time (for example, Friday at 8:30 PM). The System may aggregate, via the one or more processors, the one or more of the plurality of tips that were transmitted after the tip deadline and before the pay week end time to a tip disbursement for each of the plurality of employees. As a non-limiting example, the tip deadline may be Friday at 5 PM and the pay week end time may be the following Monday at midnight.

The invention of the present disclosure may include a wear and tear import module. The wear and tear import module may enable importation of a wear and tear spreadsheet file to the system. In such an embodiment, the following steps may occur in the frontend: the user of the interface may select a period of time (for example, by selection a particular week of a specific year) and only one single valid file (for example, a list or spreadsheet file), if the user is missing or selecting invalid data, then the frontend may not be able to send a request to the backend, thus, an error message may be displayed. If the user selects valid data, then the request may be sent to the backend. In an embodiment, the following steps may occur in the backend: the system saves the name of the file uploaded, the time period (for example, the year and week), the user who uploaded said file(s), and the date when the file was uploaded. The wear and tear import module may check the validity of the file type and content. In an embodiment, if the file is invalid, the wear and tear import module may generate and display an error. In such an error, the alert may mention the invalid file which will be displayed in the template. The wear and tear module may be configured to associate the file with pay data. Accordingly, the wear and tear files and associated pay data may be utilized to modify the pay for the corresponding user. In such an embodiment, the wear and tear import module may be in informatic communication with a third-party payment processing services. In the frontend, if the file is valid the system may display a success message in the template. In an embodiment, if the file includes the employee EID (External ID: which is the file identifier in the payment processor from the employee hour-tracking point of view), the employee amount for wear and tear reimbursement, may be included in the weekly payroll of each employee.

In an embodiment, the system may differentiate a number of payroll rules. For example, Payroll Type 1 may include Walkers, Bikers, and Driver (w/Own Car Operator ["OCO"]) (for example, employee's starting and ending their shifts at the same location and performing deliveries). In an embodiment, if the system does not receive a clock-in and the scheduled start time is later than the first scan, then the approved clock-in is the time of the first scan minus a twenty-minute preparation time. In effect, the system may extrapolate a substitute clock-in time based on the first scan time. For example, if the scheduled start time is 10 AM and the first scan occurs at 9:55 AM, then the approved clock-in time may be 9:35 AM (utilizing the aforementioned twenty-minute preparation time). However, the "preparation time" may be any suitable period of time and may be adjustable by the administrator and/or may be tailored or variable as a function of the employee and/or the employee/payroll type.

In an embodiment, Payroll Type 3 may include Walkers, Bikers, Drivers (w/OCO) (for example, employees starting and ending their shifts at the different location and performing deliveries). In such an embodiment, if there is no clock-in received and the scheduled start time is greater than the first scan time, then the approved clock-in time is the time of the first scan minus a preparation time (for example, a twenty-minute preparation time).

In an embodiment, the system may map the employees with the correct payroll type. The payroll module may provide a dropdown menu of the various payroll types.

In an embodiment, Walkers, Bikers, Driver (w/OCO) (DA's starting and ending their shifts at the same location and performing deliveries) may be described as having delivery positions, comprising the following characteristics: such employees have client's scan data; and such employees can have shifts and time clocks in humanity.

In an embodiment, SMA's, Shift Coordinators, Bike Mechanics/Technicians, Flow Expeditors, Valets (DA's starting and ending their shifts at the same location and not performing deliveries) may be described as employees who are not delivery associates, having the following characteristics: such employees do not have client's scan data; and such employees can have shifts and time clocks in humanity.

In an embodiment, Walkers, Bikers, Driver (w/OCO) (DA's starting and ending their shifts at different locations and performing deliveries) may be described as delivery associates where the clock-out is not performed at the scheduled remote site, having the following characteristics: such employees have scan data; and such employees can have shifts and time clocks in humanity.

In an embodiment, MM Driver (DA's starting and ending their shifts at the same location and not performing deliveries) may be described as MM drivers, having the following characteristics: such employees do not have scan data; and such employees can have shifts and time clocks in humanity. In an embodiment, these employees may have specific humanity positions and those positions may be represented in the payroll module.

In an embodiment, salaried employees may be described as employees that have yearly salary and are exempt from overtime, having the following characteristics: such employees that are working, but do not have shifts and/or time clocks in humanity.

In an embodiment, the system may be configured to handle special cases of payroll. For example, the payroll module may be configurable by administrators for instances where the characteristics of one payroll type/position may not be proper for a particular employee. As a non-limiting example, an employee that would normally have time clock restrictions or limitations may have such restrictions and/or limitations lifted by the administrator's discretion.

As a non-limiting example, Employee Sam was scheduled for a shift with Position (schedule): Position1 related to Location123; Remote site: Remote1. Thus, in such a non-limiting example, Employee Sam has a shift with Position1, he clocked in for Position1, and he has a time clock related to this shift.

The In Distance may be the difference between the clock-in GPS geoposition and the remote site position (for example, "Remote 1 geo position"). The Out Distance may be the difference between the clock-out GPS geoposition and the remote site position (for example, "Remote 1 geo position").

The following table may contain special cases. For each case the system may focus on how to calculate the In Distance and the Out Distance, which rules should be applied, and what can be the presentation in the payroll module table in the dashboard. The following proposed rules and definitions are non-limiting examples.

| Employee | Employee Sally | Employee José | Employee from Payroll Type 3 | Employee Carlos |
|---|---|---|---|---|
| Description | An Employee that doesn't work in the scheduled Position. | DA transferred from a position to another one. José was | The clock out is not done in the remote site. | An Employee that was scheduled for a shift without a remote site. |

-continued

| Employee | Employee Sally | Employee José | Employee from Payroll Type 3 | Employee Carlos |
|---|---|---|---|---|
| | Sally was scheduled for a shift with aPosition(schedule): PositionA related to LocationABC, Remote site: RemoteA => She has a shift with PositionA An administrator asked her to work for Position1 related to Location123; She clocked in for Position1 => She has a time clock with Position1 | scheduled for shift with Position(schedule): Position1 related to Location123 Remote site: Remote1 => He has a shift with Position1 He clocked in for Position1 Then he was transferred to Position2 He was clocked out from the first shift A new shift for Position2 was created and he was clocked in there => This DA has One timeclock related to shift 1 and another timeclock related to shift 2 | (different location from the clock in) | Carlos was scheduled for shift with Position(schedule): PositionA related to LocationABC And no remote site => He has a shift with PositionA He clocked in for PositionA => He has a timeclock related to this shift |
| How to detect the case? | An employee that has, on the same day: A Time clock without shift; A shift with a position different from the time clock position | An employee that has: a shift and a related timeclock And Another shift related with another timeclock. | An employee from payroll type 3 | Shift without a remote site |
| How to calculate the In Distance? | The In Distance is the difference between clock in GPS geo position and the location of the new position (Location123 geo position). | The In Distance is the difference between clock in gps geo position and the remote site (Remote1 geo position). | The Distance is the difference between clock in gps geo position and the remote site (RemoteA geo position). | The Distance may be the difference between clock in gps geo position and the location (LocationABC geo position). OR the difference between clock in gps geo position and a default location (related to the program) |
| How to calculate the Out Distance? | The Out Distance is the difference between clock out GPS geo position and the location of the new position (Location123 geo position) | The Out Distance is the difference between clock out gps geo position and the remote site(Remote1 geo position). | The Distance is the difference between clock out gps geo position and last delivery geo position In the case of certain clients: the system can retrieve the scan data (1st scan, last scan, last delivery location) from: A specific solution on smartphone app (client's | The Distance may be the difference between clock out gps geo position and the location (LocationABC geo position). OR the difference between clock out gps geo position and a default location (related to the program) |

-continued

| Employee | Employee Sally | Employee José | Employee from Payroll Type 3 | Employee Carlos |
|---|---|---|---|---|
| Payroll Rules | For this DA, there may be a shift and a time clock without shift. | For this DA, we have 2 rows (shift1 + timeclock, shift 2 + timeclock) The system may apply rules for each row separately and the total worked hours will be the sum of the worked hours in the two timeclocks | mobile app) OR from the client system. The system may determine the payroll rules | The system may determine the payroll rules |
| Payroll Table Presentation | In the payroll table, the System presents a column "Time clock Position" next to Scheduled Position (to show that the time clock is not related to the shift). In columns location in/ location out: The system may put "reference location" instead of "scheduled location." | The system may show two sub rows for the DA on the day x. | The system may determine the payroll table presentation | The system may determine the payroll table presentation |

In an embodiment, the system may calculate the distance between a scheduled location and the clock in/out location. For example, third-party map software may include an API that may allow the System to calculate the distance between the two locations and take into account the mode of transportation (for example, driving, walking, or bicycling). The calculated distance may be represented in miles. The calculated distance may also be converted to any reasonable unit of measurement.

In an embodiment, the System may include additional modules. In an embodiment, the system may include an ATAP module or may be in communication with an ATAP module. In an embodiment, the actual ATAP may be transferred to a new code base and may be improved to have an improved User Interface or User Experience and adapted to the new payroll vision.

The work schedule of each employee may include the times at which the employee is expected to work (for example, clock-in and clock-out). Further, the work schedule may include the deliveries that the employee is scheduled to deliver for a particular day. In such an embodiment, the work schedule may be modifiable by administrators or, generally, the System. Accordingly, the work schedule may include the set or group of packages assigned to the employee and the corresponding delivery addresses and/or other delivery information. The employee may scan the packages, via the employee device, causing the scan data and the package data to transmit to the System, wherein the System may record the location, time, and/or other details correlating to the package. Thus, the work schedule may be cross-referenced to determine which deliveries have been successfully delivered. Further, the scan data may be utilized to determine at what time and where the employee was during different parts of their workday.

In an embodiment, the System includes a number of allowable thresholds, which may impact the approval status of an employee's pay. For example, there may be thresholds associated with In Distance, Out Distance, and differentials in scanning/check-in/scheduled times. Thus, each approval status (approved, auto-approved, declined, etc.) may be associated with different thresholds. In such an embodiment, payroll may be automated, wherein the approval status is a function of the employee's distances, times, etc. relative to the pre-determined thresholds.

In an embodiment, the invention of the present disclosure is a computer system for payroll management comprising one or more processors, one or more computer-readable memories, and one or more computer-readable storage devices, and program instructions stored on at least one of the one or more computer-readable storage devices for execution by at least one of the one or more processors via at least one of the one or more computer-readable memories, where the stored program instructions cause the one or more processors to: correlate, via the one or more processors, each of a plurality of employees to one of a plurality of scheduled positions; correlate, via the one or more processors, each of the plurality of scheduled positions to a payroll type. For example, the System may include a database, wherein the employee is linked to both a scheduled position and a corresponding payroll type. Administrators may make adjustments to such a table. The stored program instructions may further cause the one or more processors to determine, via the one or more processors, a scheduled start time, a scheduled end time, a scheduled location-in location, and a scheduled location-out location based on a work schedule for each of the plurality of employees, wherein the work schedule for each of the plurality of employees is stored in the one or more computer-readable storage devices; and receive, via an employee device, a first scan time and a clock-in time, wherein the employee device is in electronic communication with at least the one or more computer-readable memories, wherein the first scan time is transmitted from the employee device to at least the one or more computer-readable memories, wherein the first scan time is generated based on electronic scanning of a first package of a plurality of packages, and wherein the clock-in time is generated based on a clock-in input via the employee device. Accordingly, the electronic scanning of the package may trigger a signal to be sent to the server and/or the System, generally. For example, the signal may include characteristics of the scanning such as time, geolocation, observed defects with the package, and/or other notes regarding the packages. In an embodiment, the stored program instructions further cause the one or more processors to determine, via the one or more processors, an actual clock-in location based on a clock-in geolocation generated by the employee device upon the generation of the clock-in input; receive, via the employee device, a last scan time and a clock-out time, wherein the last scan time is transmitted from the employee device to at least the one or more computer-readable memories, wherein the last scan time is generated based on electronic scanning of a last package of the plurality of packages, and wherein the clock-out time is generated based on a clock-out input via the employee device; determine, via the one or more processors, an actual clock-out location based on a clock-out geolocation generated by the employee device upon the generation of the clock-out input; determine, via the one or more processors, a location-in distance based on the actual clock-in location and the scheduled location-in location; and determine, via the one or more processors, a location-out distance based on the actual clock-out location and the scheduled location-out location. Thus, the System may determine whether the employee has truthfully clocked-in and/or whether the employee is following their set schedule. In effect, the tracking of geolocation and time of scans may be further utilized to determine performance and attendance metrics. Therefore, the tracking of geolocation and scan times may be utilized to determine whether pay should be withheld, declined, or approved.

In a further aspect, the stored program instructions may further cause the one or more processors to compare, via the one or more processors, the location-in distance to a location-in distance threshold; and compare, via the one or more processors, the location-out distance to a location-out distance threshold. In one embodiment, a displacement may be calculated, for example, not taking into account driving distance (following conventional roads and thru fares). Instead, displacement may calculate the shortest calculable length measurement. Further, in an alternate embodiment, the driving distance may be utilized in determining the location-in distance and/or the location-out distance. In such an alternate embodiment, the employee device may send geolocation information regularly to the server, such that the System may track the actual path the employee took in between said locations.

In yet a further aspect, the stored program instructions may further cause the one or more processors to assign, via the one or more processors, one of a plurality of payroll statuses to each of the plurality of employees.

In an embodiment, the plurality of payroll statuses comprises an automatically approved status, an approved status, a declined status, and an exception status. In another aspect, the stored program instructions may further cause the one or more processors to generate, via the one or more processors, and display, via one or more displays, a payroll management module interface comprising a table populated by at least the scheduled start time, the first scan time, the clock-in time, the scheduled end time, the last scan time, the clock-out time, and the status of each of the plurality of employees.

The payroll management module interface may comprise an edit functionality configured to enable an administrator to modify at least the status of each of the plurality of employees. The payroll management module interface may comprise a sort functionality configured to enable an administrator to sort by the payroll type.

In an embodiment, the stored program instructions may further cause the one or more processors to generate, if, the clock-in input is not generated and the scheduled start time is later than the first scan time, an approved clock-in time, wherein the approved clock-in time is a preparation time less than the first scan time. The approved clock-in time and/or an approved clock-out time may be utilized by the payroll module to determine pay and/or approval status. For example, the actual pay disbursed to the employee may be based on the approved clock-in and approved clock-out times as calculated by a set of payroll rules. The payroll rules may differentiate based on the order of scheduled times versus clocked times versus scan times.

In a further embodiment, the stored program instructions further cause the one or more processors to import, via the one or more processors, a tip spreadsheet to the one or more computer-readable storage devices, wherein the tip spreadsheet comprises a plurality of tips, wherein each of the plurality of the tips corresponds to a pay week and one of the plurality of employees; determine, via the one or more processors, whether one or more of the plurality of tips was transmitted after a tip deadline and before a pay week end time; and aggregate, via the one or more processors, the one or more of the plurality of tips that were transmitted after the tip deadline and before the pay week end time to a tip disbursement for each of the plurality of employees. The stored program instructions may further cause the one or more processors to generate, via the one or more processors, and display, via one or more displays, a tips interface, wherein the tips interface comprises a tip visualization based on the plurality of tips for one of the plurality of employees.

Finally, other implementations of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A computer system for payroll management comprising one or more processors, one or more computer-readable memories, and one or more computer-readable storage devices, and program instructions stored on at least one of the one or more computer-readable storage devices for execution by at least one of the one or more processors via at least one of the one or more computer-readable memories, wherein the stored program instructions cause the one or more processors to:

correlate, via the one or more processors, each of a plurality of employees to one of a plurality of scheduled positions;

correlate, via the one or more processors, each of the plurality of scheduled positions to a payroll type;

determine, via the one or more processors, a scheduled start time, a scheduled end time, a scheduled location-in location, and a scheduled location-out location based on a work schedule for each of the plurality of employees,
- wherein the work schedule for each of the plurality of employees is stored in the one or more computer-readable storage devices;

receive, via an employee device, a first scan time and a clock-in time,
- wherein the employee device is in electronic communication with at least the one or more computer-readable memories,
- wherein the first scan time is transmitted from the employee device to at least the one or more computer-readable memories,
- wherein the first scan time is generated based on electronic scanning of a first package of a plurality of packages to be delivered, and
- wherein the clock-in time is generated based on a clock-in input via the employee device;

determine, via the one or more processors, an actual clock-in location based on a clock-in geolocation generated by the employee device upon the generation of the clock-in input;

receive, via the employee device, a last scan time and a clock-out time,
- wherein the last scan time is transmitted from the employee device to at least the one or more computer-readable memories,
- wherein the last scan time is generated based on electronic scanning of a last package of the plurality of packages to be delivered, and
- wherein the clock-out time is generated based on a clock-out input via the employee device;

determine, via the one or more processors, an actual clock-out location based on a clock-out geolocation generated by the employee device upon the generation of the clock-out input;

determine, via the one or more processors, a location-in distance based on the actual clock-in location and the scheduled location-in location;

determine, via the one or more processors, a location-out distance based on the actual clock-out location and the scheduled location-out location; and receive, via the employee device, geolocation data comprising an actual path taken between the actual clock-in location and the actual clock-out location by each employee of the plurality of employees.

2. The computer system of claim 1, wherein the stored program instructions further cause the one or more processors to:
- compare, via the one or more processors, the location-in distance to a location-in distance threshold; and
- compare, via the one or more processors, the location-out distance to a location-out distance threshold.

3. The computer system of claim 2, wherein the stored program instructions further cause the one or more processors to:
- assign, via the one or more processors, one of a plurality of payroll statuses to each of the plurality of employees.

4. The computer system of claim 3, wherein the plurality of payroll statuses comprises an automatically approved status, an approved status, a declined status, and an exception status.

5. The computer system of claim 4, wherein the stored program instructions further cause the one or more processors to:
- generate, via the one or more processors, and display, via one or more displays, a payroll management module interface comprising a table populated by at least the scheduled start time, the first scan time, the clock-in time, the scheduled end time, the last scan time, the clock-out time, and the status of each of the plurality of employees.

6. The computer system of claim 5, wherein the payroll management module interface comprises an edit functionality configured to enable an administrator to modify at least the status of each of the plurality of employees.

7. The computer system of claim 5, wherein the payroll management module interface comprises a sort functionality configured to enable an administrator to sort by the payroll type.

8. The computer system of claim 1, wherein the stored program instructions further cause the one or more processors to:
- generate, if, the clock-in input is not generated and the scheduled start time is later than the first scan time, an approved clock-in time,
  - wherein the approved clock-in time is a preparation time less than the first scan time.

9. The computer system of claim 1, wherein the stored program instructions further cause the one or more processors to;
- import, via the one or more processors, a tip spreadsheet to the one or more computer-readable storage devices,
  - wherein the tip spreadsheet comprises a plurality of tips,
  - wherein each of the plurality of the tips corresponds to a pay week and one of the plurality of employees;
- determine, via the one or more processors, whether one or more of the plurality of tips was transmitted after a tip deadline and before a pay week end time; and
- aggregate, via the one or more processors, the one or more of the plurality of tips that were transmitted after the tip deadline and before the pay week end time to a tip disbursement for each of the plurality of employees.

10. The computer system of claim 9, wherein the stored program instructions further cause the one or more processors to:
- generate, via the one or more processors, and display, via one or more displays, a tips interface,
  - wherein the tips interface comprises a tip visualization based on the plurality of tips for one of the plurality of employees.

* * * * *